United States Patent
Wierzbitzki et al.

(10) Patent No.: US 6,650,891 B1
(45) Date of Patent: Nov. 18, 2003

(54) SMS-SUPPORTED METHOD FOR ONLINE/ OFFLINE DETECTION OF USER GROUPS IN MOBILE WIRELESS NETWORKS

(75) Inventors: Dirk Wierzbitzki, Ratingen (DE); Robert Wiedemann, Düsseldorf (DE)

(73) Assignee: Mannesmann AG, Düsseldorf (DE)

( * ) Notice: Subject to any disclaimer, the term of this patent is extended or adjusted under 35 U.S.C. 154(b) by 380 days.

(21) Appl. No.: 09/645,746

(22) Filed: Aug. 24, 2000

(30) Foreign Application Priority Data

Aug. 24, 1999 (DE) ......................... 199 41 164

(51) Int. Cl.[7] ............................... H04M 3/42
(52) U.S. Cl. .................. 455/414.3; 455/466; 455/518; 709/204
(58) Field of Search .................. 455/414, 415, 455/416, 412, 466, 435, 433, 458, 517, 518, 519; 709/204–207, 224, 227

(56) References Cited

U.S. PATENT DOCUMENTS 6,223,026 B1 * 4/2001 Martschitsch ............... 455/407
6,477,384 B2 * 11/2002 Schroderus et al. ........ 455/500
6,512,930 B2 * 1/2003 Sandegren ................. 455/518
2001/0034224 A1 * 10/2001 McDowell et al. ......... 455/412

* cited by examiner

Primary Examiner—Lester G. Kincaid
Assistant Examiner—Ronald J. Ward
(74) Attorney, Agent, or Firm—Cohen, Pontani, Lieberman & Pavane

(57) ABSTRACT

An apparatus and method for informing a first mobile wireless subscriber identity module which is signed on to a mobile wireless network about further mobile wireless subscriber identity modules that are likewise signed on to a mobile wireless network includes sending a mobile wireless short message to each of the further mobile wireless subscriber identity modules. Based on the delivery to a mobile wireless subscriber identity module of pertinent delivery information, the further mobile wireless subscriber identity modules that are likewise signed on in a mobile wireless network may be determined. A short message may then be sent to the first mobile wireless subscriber identity module including information about which of the further mobile wireless subscriber identity modules are currently signed on to a mobile wireless network.

32 Claims, 1 Drawing Sheet

SMS-SUPPORTED METHOD FOR ONLINE/ OFFLINE DETECTION OF USER GROUPS IN MOBILE WIRELESS NETWORKS

BACKGROUND OF TH INVENTION

Field of the Invention

The invention is directed to a method and an apparatus for providing information to a mobile wireless subscriber signed onto a mobile wireless network with a terminal identified by a first mobile wireless subscriber identification card, the information concerning further terminals identified by other mobile wireless subscriber identification cards that are likewise signed on to a mobile wireless network.

SUMMARY OF THE INVENTION

It is the object of the present invention to provide a method and apparatus for sending information to a mobile wireless subscriber signed on to a mobile wireless network concerning other mobile wireless subscribers who are likewise signed on to a mobile wireless network and identified by their mobile wireless subscriber identification card, especially other mobile wireless subscribers who are signed on to the Internet/Wireless Application Protocol (WAP).

This object is met by a method for providing information to a mobile subscriber identified by a first subscriber identification card signed on to a mobile wireless network, the information concerning which ones of a plurality of further subscriber identification cards are also currently also signed onto a mobile wireless network, comprising the steps of, (a) sending a mobile wireless short message to each of the plurality of further subscriber identification cards, (b) establishing delivery information by signed on ones of the plurality of further subscriber identification cards which are signed on to mobile wireless networks, (c) determining which of the plurality of further subscriber identification cards are signed onto mobile wireless networks based on the delivery information established in step (b); and (d) transmitting information to the first subscriber identification card indicating the signed on ones of the plurality of further subscriber identification cards determined in step (c).

The object is also met by an apparatus for providing information to a mobile subscriber identified by a first subscriber identification card which is signed on to a mobile wireless network, the information concerning which ones of a plurality of further subscriber identification cards are likewise signed on to a mobile wireless network, comprising, a mobile wireless short message generating device for generating mobile wireless short messages to each of the plurality of further subscriber identity modules and for sending the mobile wireless short messages to the plurality of further mobile wireless subscriber identification cards, a delivery information monitoring device for determining signed on ones of the plurality of further subscriber identification cards that are signed on to a mobile wireless network based on a delivery of the mobile wireless short message to each mobile wireless subscriber identity module concerning delivery information, and a mobile wireless subscriber information device for transmitting information to the first subscriber identification card about the signed on ones of the plurality of further subscriber identification cards determined by the delivery information monitoring device.

The methods and apparatus according to the present invention allow a mobile wireless terminal user with a mobile wireless terminal and a first mobile wireless subscriber identification card to receive information about further mobile wireless subscribers who are also signed on to a mobile wireless network in a simple, efficient, economical and user-friendly manner. More specifically, the present invention allows the mobile wireless terminal user to receive information which indicates further mobile wireless subscriber identification cards which are signed on to the Internet via Wireless Application Protocol (WAP). Based on this information, a mobile terminal user with the first mobile wireless subscriber identification card has an overview of other mobile wireless subscriber identification cards of colleagues, friends, and others who are simultaneously signed on.

The method is suitable for mobile wireless subscriber identification cards and terminals which are suitable for WAP or other terminals that are freely connected.

According to an embodiment of the present invention, a query is made via an empty (without text) mobile wireless short message to each individual one of further mobile wireless subscriber identification cards to determine whether they are signed on to mobile wireless network. The transmittal of the mobile wireless short message may be effected using the Global System for Mobile Communication (GSM) standard, the General Packet Radio Service (GPRS) standard, the Universal Mobile Telecommunications System (UMTS) standard or other locally defined standard. In particular, the empty mobile wireless short message may comprise a standardized mobile terminated short message (SMS-MT) with an acknowledgement request.

The determination as to whether a user identified by one of the further mobile wireless subscriber identification cards is likewise signed on to a mobile wireless network and/or into the Internet via WAP is made on the basis of delivery information in the form of an acknowledgement of receipt of the mobile wireless short message with this further mobile wireless subscriber identification card. Alternatively or in addition, the determination of which users identified by mobile wireless subscriber identification cards are also signed on to a mobile wireless network and/or Internet/WAP based on negative delivery information such as internal information within the mobile wireless network about the fact that the mobile wireless short message was not yet transmitted to the terminal of the further mobile wireless subscriber identification card. In GSM, the internal information may comprise a message waiting flag used in the mobile wireless network. The mobile wireless short message waiting flag is set until the mobile wireless short message has been received. Accordingly, if no short message waiting flag is present, it is assumed that the message was received and the mobile wireless subscriber identification card to which the message was sent is signed on.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
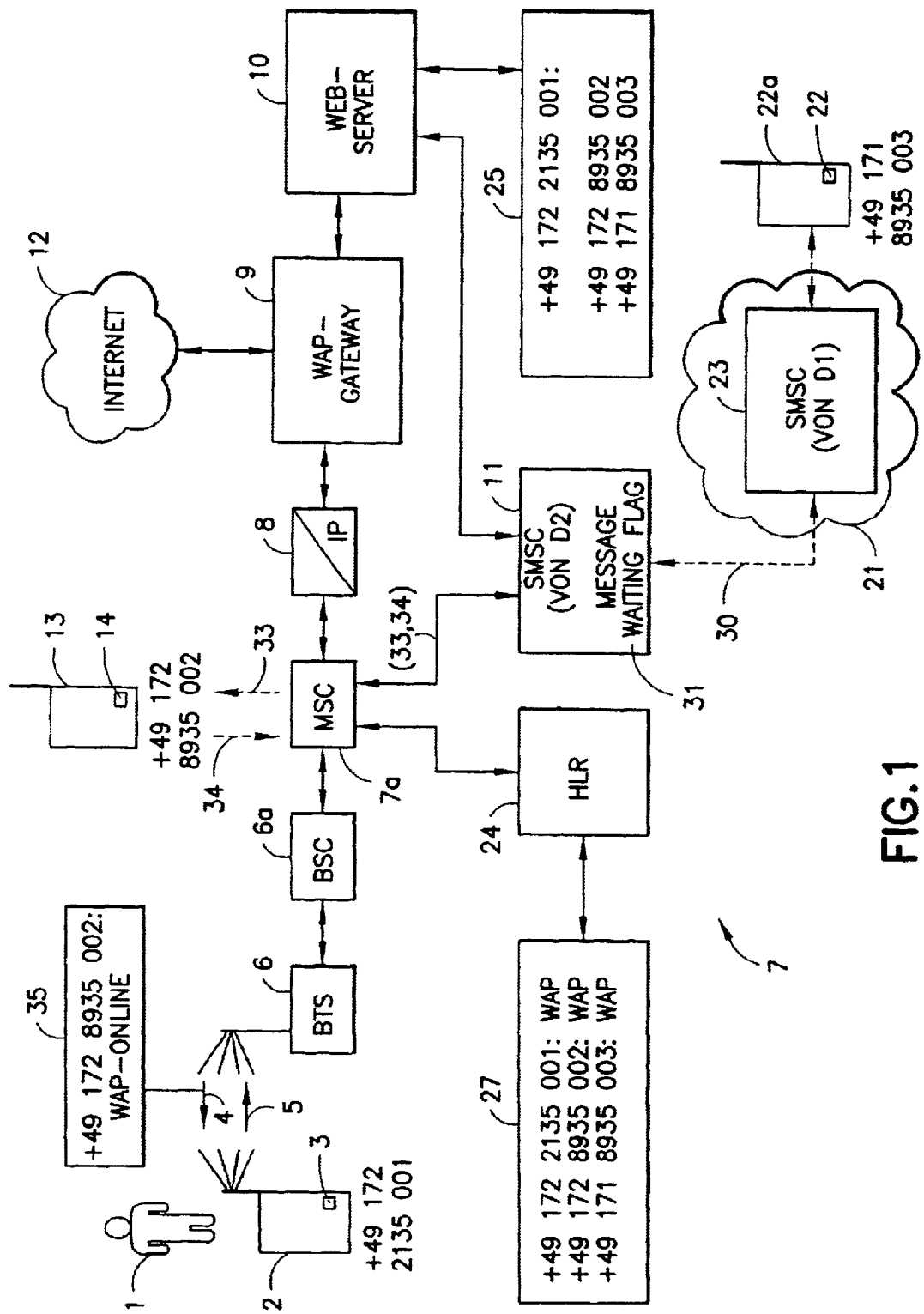
FIG. 1 is a block diagram representing the components of an apparatus according to an embodiment of the present invention for providing information to a mobile user identified by a first mobile wireless subscriber identification card signed on to a mobile wireless network, the information concerning further terminals identified by mobile wireless subscriber identification cards signed on to a mobile wireless network.

FIG. 1 shows a user 1 of a first mobile wireless terminal 2 with a first mobile wireless Subscriber Identity Module (SIM) 3, i.e., a subscriber identification card, with an identification number +491722135001 which is signed on to a mobile wireless network 7 via wireless interface 4, 5 with a base transceiver station BTS 6. The mobile wireless network 7 may comprise any mobile wireless network known to a person skilled in the art such as, for example, GSM, UMTS or other mobile wireless networks. The mobile wireless network 7 comprises, among other things, the wireless interface 4, 5 to the SIM 3, a Base Transceiver Station BTS 6 and Base Station Controller 6a, a Mobile Switching Center MSC 7a, an Internet protocol interface device 8, a Wireless Application Protocol (WAP) gateway server 9 for connecting the mobile wireless network 7 to the Internet 12 by WAP, a Web server 10 for executing the Internet/WAP-related functions arranged, for example, in a Network Management Center (NMC), a mobile wireless network short message center (SMSC) 11 of the mobile wireless network 7, and a second mobile terminal 13 with a second SIM 14. The second mobile terminal 13 and second SIMH are connected to the network 7 via a wireless interface 33, 34 via a local BTS and BSC (not shown).

FIG. 1 also shows a further mobile wireless network 21 with its own SMSC 23 and a third SIM 22 in a third mobile terminal 22a which is signed on to the further mobile wireless network 21 in a manner similar to the way that the first and second SIMs 3, 14 are signed on to mobile wireless network 7.

According to the present invention, the mobile wireless subscriber 1 signs on to the mobile wireless network 7 with his first mobile wireless terminal 2 which contains the first SIM 3 via a wireless interface 4 and the BTS 6. The mobile wireless subscriber 1 requires information concerning which of the further mobile wireless subscribers on his list of contacts that are currently likewise signed on to a mobile wireless network and possibly also in WAP (the mobile wireless subscribers on his list are in each case identified by a further SIM in a mobile wireless terminal). The information may be displayed, in particular with the use of WAP, in the first mobile wireless terminal 2. In the embodiment shown in FIG. 1, the SIM 3 is signed on to the mobile wireless network 7 via the first mobile wireless terminal 2. The MSC 7a determines the Home Location Register (HLR) 24 of the SIM 3 based on the identity of the SIM 3. Once the HLR 24 of the SIM 3 is determined, a query is made in a table 27 as to whether a WAP service of the mobile wireless network 7 is subscribed to and is to be activated for the SIM 3 with the identification number +491722135001. In the present case, the WAP service is subscribed and activated. The mobile wireless network 7 then transmits the identification number +491722135001 to an Internet protocol interface device 8 representing the mobile wireless network's Internet protocol interface to the Internet protocol IP. The internet protocol interface device 8 then sends the identification number of the SIM 3 to a WAP gateway 9 by Internet protocol.

A Web server 10 which may be connected with the WAP gateway 9 comprises a data base with a list 25 of the second and third SIMS 14, 22 and others that are to be individually checked with respect to whether they are currently signed on in a mobile wireless network when the first SIM 3 is signed on. The list 25 is identified to the first SIM 3 directly or by the identification number of the first SIM 3. The identification number of the second SIM 14 to be checked for sign on to a mobile wireless network and possibly additionally in WAP is passed on by the Web server 10 to the short message center SMSC 11 of the mobile wireless network 7 as a blind short message—i.e., a short message without text which is not displayed to the recipient. The short message center SMSC 11 of the mobile wireless network 7 transmits the short message in the usual way to the second mobile wireless terminal 13 associated with the second SIM 14 which is to be checked with respect to whether or not it is signed on. In addition, the HLR (not shown) of the second SIM 14 is determined on the basis of the identification number of the second SIM 14 by the MSC 7a. Furthermore, the Visiting Location Register (VLR) (not shown) in which the second SIM 14 is currently entered and the BTS, BSC (not shown) by which the short message is to be sent to the second SIM 14 may also be checked.

The second SIM 14 receives the blind short message which is not shown on the display of second mobile wireless terminal 13 because it contains no text. Upon receipt of the blind short message, an acknowledgement signal is sent back to the SMSC 11 in the usual manner as acknowledgement of the receipt of the blind short message at the terminal 13 with the second SIM 14. Upon receipt of the acknowledgement, the SMSC 11 informs the WAP server 10 that the second SIM 14 is currently signed on to the mobile wireless network. This information may be indicated to the mobile wireless subscriber 1 by, for example, a short message 35 transmitted to the mobile wireless terminal 2. In addition, the WAP server 10 may be checked to determine whether the second SIM 14 is also signed on in WAP and this can also be indicated to the user 1 of the SIM 3. The corresponding process is repeated for the remainder of the identification numbers in the list 25.

The results may be transmitted to the SIM 3 after all the SIMs in list 25 are interrogated. Alternatively, the results may be sent to the SIM 3 as they are updated. Instead of checking the acknowledgement, a message waiting flag may also be checked within the mobile wireless network 7. The message waiting flag is set within the network in the SMSC 11 until the blind mobile wireless short message has arrived at the terminal being interrogated, for example, the terminal with the second SIM 14. As long as the message waiting flag is still set, it may be assumed that the potential SMS recipient or his card is not signed on to a mobile wireless network. Conversely, when no message waiting flag is present for a particular SMS recipient, it is assumed that the particular recipient is signed on. The above method may also be used to check whether a SIM is signed on to networks other than the mobile wireless network 7 (e.g., D2) in which the first mobile wireless subscriber identification card 3 is signed on. The other mobile wireless network 21, may, for example, comprise D1, E-Plus, or E2 in Germany. The query in other networks may be carried out, for example, via an SMS gateway 30 (and MSC, etc., not shown) between the SMSC 11 of the first mobile wireless network 7 of the first SIM 3 and the SMSC 23 of the further mobile wireless network 21 of, for example, the third SIM 22 with identification number +491718935003. Alternatively, a short message may be sent to the third SIM 22 to be checked via the Internet, particularly by WAP 9, and the Internet gateway of the other mobile wireless communications network 21.

All of the mobile wireless subscriber identification card identities (or associated names, etc.) that are indicated in the short message 35 to the SIM 3 by the WAP server 10 as signed on to a mobile wireless network (or only in the same mobile wireless network, for example) are displayed optically and/or acoustically on the first mobile wireless terminal 2 of the first SIM 3. The optical display may comprise a list on the display of the first mobile wireless terminal 2. Transmission for display on the first mobile wireless terminal 2 may be effected by simply displaying the short message 35 by the Web server 10 to the first SIM 3 via the transmission path 4.

The web server 10 contains subcomponents comprising a mobile wireless short message generating device for generating mobile wireless short messages to each of the plurality of further subscriber identity modules and for sending the mobile wireless short messages to the plurality of further mobile wireless subscriber identification cards, a delivery information monitoring device for determining signed on ones of the plurality of further subscriber identification cards that are signed on to a mobile wireless network based on a delivery of the mobile wireless short message to each mobile wireless subscriber identity module concerning delivery information, and a mobile wireless subscriber information device for transmitting information to the first subscriber identification card about the signed on ones of the plurality of further subscriber identification cards determined by the delivery information monitoring device The method and the apparatus according to the present invention are also applicable particularly with GPRS. In addition to Internet users signed on with WAP, the terminal user 1 may also be informed via the short message 35 and display a list of Internet users currently signed on via the Internet without WAP (that is, via the fixed network) which are detected as logged on to the Internet via known messengers (AOL, etc.).

The present invention may be realized within the mobile wireless network especially with programs, but is not characterized solely by this nor limited to such an embodiment.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A method for providing information to a mobile subscriber identified by a first subscriber identification card signed on to a mobile wireless network, the information concerning which ones of a plurality of further subscriber identification cards are currently also signed onto a mobile wireless network, comprising the steps of:

(a) sending a mobile wireless short message to each of the plurality of further subscriber identification cards;

(b) establishing delivery information by signed on ones of the plurality of further subscriber identification cards which are signed on to mobile wireless networks, wherein said delivery information is established only for signed on ones of the further subscriber identification cards that are also signed on to the Internet via WAP;

(c) determining which of the plurality of further subscriber identification cards are signed onto mobile wireless networks based on the delivery information established in said step (b); and (d) transmitting information to the first subscriber identification card indicating the signed on ones of the plurality of further subscriber identification cards determined in said step (c).

2. The method of claim 1, wherein said step (a) comprises sending a mobile wireless short message to each of the plurality of further subscriber identification cards stored in a list which relates to the first subscriber identity module.

3. The method of claim 2, further comprising the step of preparing the list of further subscriber identification cards by the user of the first subscriber identification cards and transmitting the list to the mobile wireless network via one of oral and short message transmission.

4. The method of claim 1, wherein said step (a) is performed at a time comprising one of a time when the first subscriber identification card is first signed on to the mobile wireless network and periodic time intervals.

5. The method of claim 1, wherein said step (a) is performed when requested by the user of the first subscriber identification card.

6. The method of claim 1, wherein said step (a) comprises sending a mobile wireless short message to further subscriber identification cards that are subscribed to the same mobile wireless network to which the first subscriber identification card subscribes.

7. The method of claim 1, wherein said step (a) comprises sending a mobile wireless short message via a system other than a Global System for Mobile Communication and a Universal Mobile Telecommunications System.

8. The method of claim 1, wherein said step (a) comprises sending a mobile wireless short message that is an empty message without any text displayable on a mobile wireless terminal.

9. The method of claim 1, wherein in said step (b), said step of establishing delivery information comprises automatically generating a reception acknowledgement and sending the reception acknowledgement toward the first subscriber identification card by the signed on ones of the further subscriber identification cards.

10. The method of claim 1, further comprising the step of identifying the plurality of further subscriber identification cards on the basis of an identity number.

11. The method of claim 1, wherein said step (d) comprises transmitting the information via a mobile wireless short message which is to be displayed by one of an optical display and an acoustic display on a terminal of the user.

12. A method for providing information to a mobile subscriber identified by a first subscriber identification card signed on to a mobile wireless network, the information concerning which ones of a plurality of further subscriber identification cards are currently also signed onto a mobile wireless network, comprising the steps of:

(a) sending a mobile wireless short message to each of the plurality of further subscriber identification cards including sending a mobile wireless short message to further subscriber identification cards that are subscribed to mobile wireless networks other than the mobile wireless network to which the first subscriber identification card subscribes;

(b) establishing delivery information by signed on ones of the plurality of further subscriber identification cards which are signed on to mobile wireless networks;

(c) determining which of the plurality of further subscriber identification cards are signed onto mobile wireless networks based on the delivery information established in said step (b); and (d) transmitting information to the first subscriber identification card indicating the signed on ones of the plurality of further subscriber identification cards determined in said step (c).

13. A method for providing information to a mobile subscriber identified by a first subscriber identification card signed on to a mobile wireless network, the information concerning which ones of a plurality of further subscriber identification cards are currently also signed onto a mobile wireless network, comprising the steps of:

(a) sending a mobile wireless short message to each of the plurality of further subscriber identification cards by sending a mobile wireless short message comprising a Global System for Mobile Communication short message;

(b) establishing delivery information by signed on ones of the plurality of further subscriber identification cards which are signed on to mobile wireless networks;

(c) determining which of the plurality of further subscriber identification cards are signed onto mobile wireless networks based on the delivery information established in said step (b); and (d) transmitting information to the first subscriber identification card indicating the signed on ones of the plurality of further subscriber identification cards determined in said step (c).

14. A method for providing information to a mobile subscriber identified by a first subscriber identification card signed on to a mobile wireless network, the information concerning which ones of a plurality of further subscriber identification cards are currently also signed onto a mobile wireless network, comprising the steps of:

(a) sending a mobile wireless short message to each of the plurality of further subscriber identification cards by sending a mobile wireless short message comprising a Universal Mobile Telecommunications System short message;

(b) establishing delivery information by signed on ones of the plurality of further subscriber identification cards which are signed on to mobile wireless networks;

(c) determining which of the plurality of further subscriber identification cards are signed onto mobile wireless networks based on the delivery information established in said step (b); and (d) transmitting information to the first subscriber identification card indicating the signed on ones of the plurality of further subscriber identification cards determined in said step (c).

15. A method for providing information to a mobile subscriber identified by a first subscriber identification card signed on to a mobile wireless network, the information concerning which ones of a plurality of further subscriber identification cards are currently also signed onto a mobile wireless network, comprising the steps of:

(a) sending a mobile wireless short message to each of the plurality of further subscriber identification cards;

(b) establishing delivery information by signed on ones of the plurality of further subscriber identification cards which are signed on to mobile wireless networks wherein said step of establishing delivery information comprises monitoring a status flag for each of the plurality of further subscriber identification cards, wherein the presence of the status flag indicates that the mobile wireless short message sent in said step (a) has not reached a particular one of the plurality of further subscriber identification cards and that the particular one of the plurality of further subscriber identification cards is not signed on, the status flag comprising a message waiting flag in one of a Global System for Mobile Communications and a Universal Mobile Telecommunications System;

(c) determining which of the plurality of further subscriber identification cards are signed onto mobile wireless networks based on the delivery information established in said step (b); and (d) transmitting information to the first subscriber identification card indicating the signed on ones of the plurality of further subscriber identification cards determined in said step (c).

16. A method for providing information to a mobile subscriber identified by a first subscriber identification card signed on to a mobile wireless network, the information concerning which ones of a plurality of further subscriber identification cards are currently also signed onto a mobile wireless network, comprising the steps of:

(a) sending a mobile wireless short message to each of the plurality of further subscriber identification cards including sending a sender identity which prevents the first mobile wireless subscriber identification card from receiving the short message delivered to the plurality of further mobile wireless subscriber identification cards;

(b) establishing delivery information by signed on ones of the plurality of further subscriber identification cards which are signed on to mobile wireless networks;

(c) determining which of the plurality of further subscriber identification cards are signed onto mobile wireless networks based on the delivery information established in said step (b); and (d) transmitting information to the first subscriber identification card indicating the signed on ones of the plurality of further subscriber identification cards determined in said step (c).

17. An apparatus for providing information to a mobile subscriber identified by a first subscriber identification card which is signed on to a mobile wireless network, the information concerning which ones of a plurality of further subscriber identification cards are likewise signed on to a mobile wireless network, comprising:

a mobile wireless short message generating device for generating mobile wireless short messages to each of the plurality of further subscriber identity modules and for sending the mobile wireless short messages to the plurality of further mobile wireless subscriber identification cards;

a delivery information monitoring device for determining signed on ones of the plurality of further subscriber identification cards that are signed on to a mobile wireless network based on a delivery of the mobile wireless short message to each mobile wireless subscriber identity module concerning delivery information; and a mobile wireless subscriber information device for transmitting information to the first subscriber identification card about the signed on ones of the plurality of further subscriber identification cards determined by the delivery information monitoring device.

18. The apparatus of claim 17, wherein the signed on ones of the plurality of further subscriber identification cards are signed on to the Internet via WAP.

19. The apparatus of claim 17, wherein said mobile wireless short message generating device comprises a list of said plurality of further subscriber identification cards stored for the first subscriber identification card.

20. The apparatus of claim 19, wherein the list is prepared and input by the user of the first subscriber identification cards.

21. The apparatus of claim 19, wherein said mobile wireless short message generating device is operatively arranged for sending the mobile wireless short messages to only the ones of the plurality of further identification cards on the list that are subscribed to the same mobile wireless network to which the first subscriber identification card subscribes.

22. The apparatus of claim 19, wherein said mobile wireless short message generating device is operatively arranged for sending the mobile wireless short messages to only the ones of the plurality of further subscriber identification cards on the list that are subscribed to mobile wireless networks other than the mobile wireless network to which the first subscriber identification card subscribes.

23. The apparatus of claim 19, wherein the plurality of further subscriber identification cards are indicated in the list in the form of a telephone number.

24. The apparatus of claim 17, wherein said mobile wireless short message generating device is operatively arranged for sending the mobile wireless short messages at a time comprising one of a time when the first subscriber identification card signs on and periodic time intervals.

25. The apparatus of claim 17, wherein said mobile wireless short message generating device is operatively arranged for sending said mobile wireless short messages in response to a request of the user of the first subscriber identification card.

26. The apparatus of claim 17, wherein said mobile wireless short messages comprise Global System for Mobile Communications short messages.

27. The apparatus of claim 17, wherein said mobile wireless short messages comprise Universal Mobile Telecommunications System short messages.

28. The apparatus of claim 17, wherein said mobile wireless short messages comprises short messages other than Global System for Mobile Communications short messages and Universal Mobile Telecommunications System short messages.

29. The apparatus of claim 17, wherein said mobile wireless short messages comprise empty message without any text to be displayed on a mobile wireless terminal of the first subscriber identification cards.

30. The apparatus of claim 17, wherein said delivery information monitoring device is operatively arranged for determining signed on ones of the plurality of further subscriber identification cards by determining an automatically generated reception acknowledgement sent back by signed on ones of the plurality of further subscriber identification cards.

31. The apparatus of claim 17, wherein said mobile wireless short message generating device is operatively arranged for determining signed on ones of the plurality of further subscriber identification cards by determining the presence of delivery information which indicates that the mobile wireless short message has not yet reached a particular one of the further subscriber identification cards and considering each of the plurality of further ones of the subscriber identification cards as signed on when the delivery information is not present.

32. The apparatus of claim 17, wherein said mobile wireless short message is displayed on one of an optical and acoustic display on a terminal connected with said first mobile wireless subscriber identity module.

* * * * *